United States Patent [19]

Michaels

[11] Patent Number: 4,771,333

[45] Date of Patent: Sep. 13, 1988

[54] SYSTEM FOR MINIMIZING RESIDUAL CHARGE CARRYOVER IN AN ASYNCHRONOUS RASTER INPUT SCANNER

[75] Inventor: Thomas B. Michaels, Pittsford, N.Y.

[73] Assignee: Xerox Corporation, Stamford, Conn.

[21] Appl. No.: 61,747

[22] Filed: Jun. 15, 1987

[51] Int. Cl.$^4$ .............................................. H04N 3/14
[52] U.S. Cl. ................................. 358/213.29; 358/288; 358/293; 250/578
[58] Field of Search ...................... 358/213.27–213.31, 358/264, 285, 288, 293, 294; 364/518; 250/209, 578, 235

[56] References Cited

U.S. PATENT DOCUMENTS

| | | | |
|---|---|---|---|
| 4,541,061 | 9/1985 | Schoon | 364/518 |
| 4,587,415 | 5/1986 | Tsunekawa et al. | 250/204 |
| 4,591,727 | 5/1986 | Gaebelein et al. | 250/578 |
| 4,628,368 | 12/1986 | Kurata et al. | 358/293 |

Primary Examiner—L. T. Hix
Assistant Examiner—David M. Gray
Attorney, Agent, or Firm—Frederick E. McMullen

[57] ABSTRACT

Process and apparatus for minimizing residual charges in the shift registers of a CCD type scanning array in an asynchronously operated image input terminal in which the unknown arrival time of the next integration signal is predicted and, based on that prediction, the last periodic dumping pulse before the integration signal is delayed a required period of time to assure clearing of residual charges from the shift registers.

7 Claims, 7 Drawing Sheets

SYSTEM FOR MINIMIZING RESIDUAL CHARGE CARRYOVER IN AN ASYNCHRONOUS RASTER INPUT SCANNER

The invention relates to a raster input scanner, and more particularly, to a system for minimizing residual charge carryover in an asynchronous scanner.

Raster input scanners typically employ one or more arrays such as CCD's for scanning. The array converts each scanned image line into a series of charges which, following suitable processing, are output as image signals or pixels to an end user. Scanners of this type often use a transparent platen on which the image bearing document is placed face down. The scanning array for example may be carried on a carriage which traverses back and forth under the platen to provide the necessary relative motion between image and array. Other arrangements such as a fixed scanning array with movable document, etc., may be contemplated instead. An optical system focuses the array onto the image, and one or more lamps are provided to illuminate the image.

In the typical scanning process, the image area viewed by each of the array photosensors is converted into a charge potential representative of the image gray level. Scanning takes place during an integration period of preset duration. Following integration, the image charges are transferred to a pair of analog shift registers, the operating sequence being such that during the integration period, the image charges from the previously scanned line are clocked from the shift registers, leaving the shift registers free to receive the image charges from the next integration period.

The duration of the integration period, however, must be limited if undesirable saturation of the array photosensors is to be avoided. As a result, the integration/transfer cycle must occur at a rate high enough to preclude over long integration periods with resulting saturation of the array photosensors. To accommodate this situation, where the rate of image signal demand is insufficient to prevent saturation, a periodic clock driven integrate signal, referred to herein as the free run integration signal, is imposed. As a result, where there is no immediate demand for image signals by the user, integration nevertheless takes place periodically at a rate sufficient to prevent saturation. Since there is no demand for image signals, the image charges produced are discarded or dumped.

Where the scanner operates in a synchronous manner, relative scanning movement between array and image is at a fixed rate. This in turn assures a fixed timing relation between the free run integrate signals and the valid integration signals issued in response to a demand for image signals, and allows a timing relationship to be established that will assure clearing of image charges from the shift registers before new charges are introduced. However, where the scanner operates asynchronously, the relative scanning movement between array and image is not fixed but can change with demand. As a result, timing of the valid integration signals can change and thus fall out of synchronism with the periodic free run integration signals that are designed to protect the photosensors of the array from becoming saturated. When this occurs, the integration period may be too abbreviated to allow the shift registers to be fully and completely cleared of all image charges from the previous line. As a result, new charges combine with leftover charges from the previous line, resulting in a distorted and inaccurate image signal output.

In the prior art, U.S. Pat. No. 4,541,061 to Schoon discloses a system where, in a scanning apparatus, the operating clock signals are provided at a rate that matches the varying velocity of the scanning mirror through the use of a memory in which various clock rates are stored based on the known repetitive movement of the mirror, there being addressing means for addressing the memory locations. In U.S. Pat. No. 4,587,415 to Tsunekawa et al, a photodetector with timing control for controlling the information storage and information readout process of the detector is disclosed. And, in U.S. Pat. No. 4,628,368 to Kurata et al, there is disclosed a system for controlling the scanning rate of a document reader in which the speed, acceleration, and deacceleration of the reader are set according to image information stored in a buffer memory.

In contrast, the present invention provides a process for minimizing residual charges in a scanning array of the type having at least one row of sensors for scanning an image viewed by the array during an integration period, and at least one shift register for receiving the image charges developed by the sensors following the integration period, in which it is required that the shift register be cleared of residual charges during each integration period to assure an accurate and undistorted image signal output, comprising the steps of: periodically generating first integration signals defining an integration period of predetermined duration sufficient to preclude saturation of the array sensors yet sufficient to allow time for the shift register to be cleared of residual charges from the preceding integration cycle; randomly generating integration signals in response to a demand for image signals; at each integration signal, predicting the arrival time of the next integration signal; and where the predicted arrival time of the next integration signal is less than the integration period defined by the periodic first integration signals, delaying the last one of the first integration signals before the next integration signal to extend the predetermined integration period provided by the first integration signals and assure clearing of residual charges from the shift register.

Figure 1:
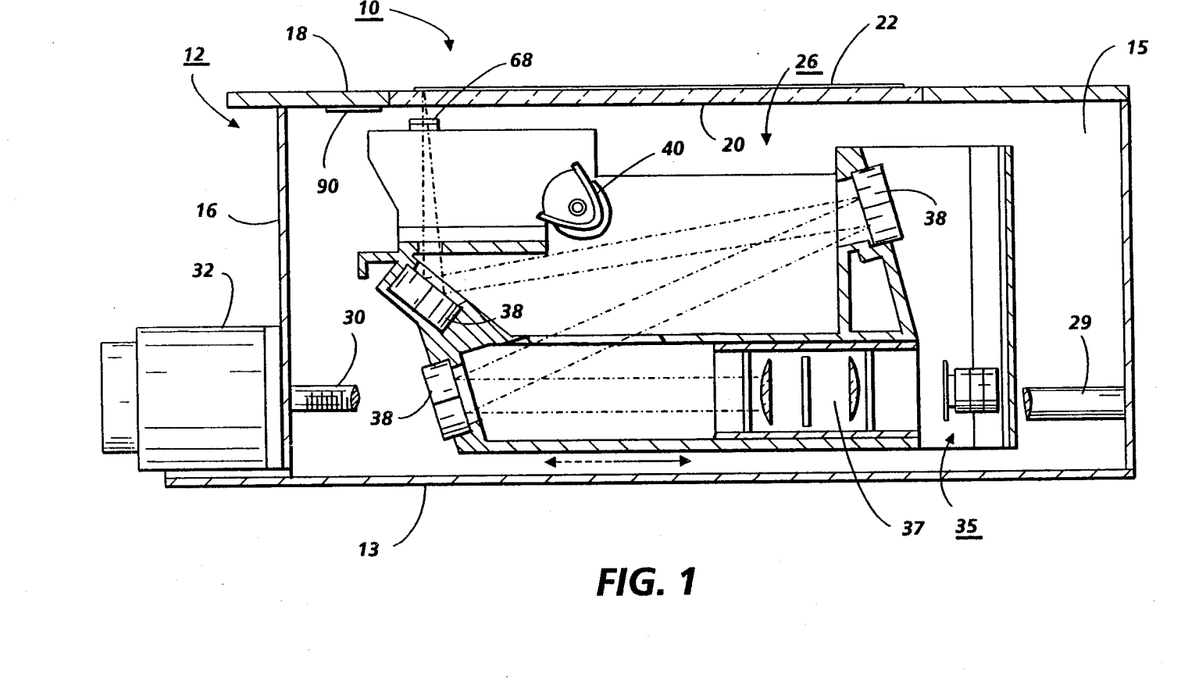
FIG. 1 is a schematic view of a raster input scanner of the type adapted for use with the screening circuit of the present invention.

Referring to FIG. 1, there is shown an exemplary raster input scanner, designated generally by the numeral 10, of the type with which the residual charge minimization system of the present invention is intended to be used. Scanner 10 includes a housing 12 with base 13, sides 15, and ends 16. The top 18 of housing 12 incorporates a generally rectangular transparent platen 20, typically glass, sized to accommodate the largest document original 22 to be scanned. As will be understood, a document 22 to be scanned is located either manually or by a suitable automatic document handler or feeder (not shown), on platen 20 for scanning. A scan carriage 26 is movably supported within housing 12 on base 13 for reciprocable movement underneath platen 20 on one or more longitudinally extending rails 29. Carriage driving means in the form of a drive screw 30 threadedly engaged with carriage 26 is provided, rotation of screw 30 in either a clockwise or counter-clockwise direction by a reversible carriage driving step motor 32 serving to move carriage 26 in either a forward or reverse direction as shown by the arrows in drawing FIG. 1.

A scanning array 35 such as a CCD is suitably mounted on scan carriage 26 in predetermined operative relation with platen 20 so as to scan the document resting thereon. Suitable optical means, exemplified here by lens 37 and mirrors 38, are provided to focus array 35 on a line-like area extending across the width of platen 20 and perpendicular to the direction of movement of carriage 26. A lamp 40 is provided for illuminating the line-like area on which array 35 is focused. A suitable clock 45 (shown in FIG. 2) provides clock signals including clock pulses $\Phi_{SH}$ and convert pulses $\Phi_1, \Phi_2$ to array 35. The image signals generated by scanning array 35 are converted to digital form by an analog-to-digital (A/D) converter 47 (shown in FIG. 3).

While a signal scanning array 35 is shown and described, plural arrays may instead be envisioned.

In the ensuing description, the integration signal (INT) refers to a request for the next line of image signals while the periodic integration that occurs in response to clock pulses $\Phi_{SH}$ is referred to as free run integration (FREE RUN INT).

Figure 2:
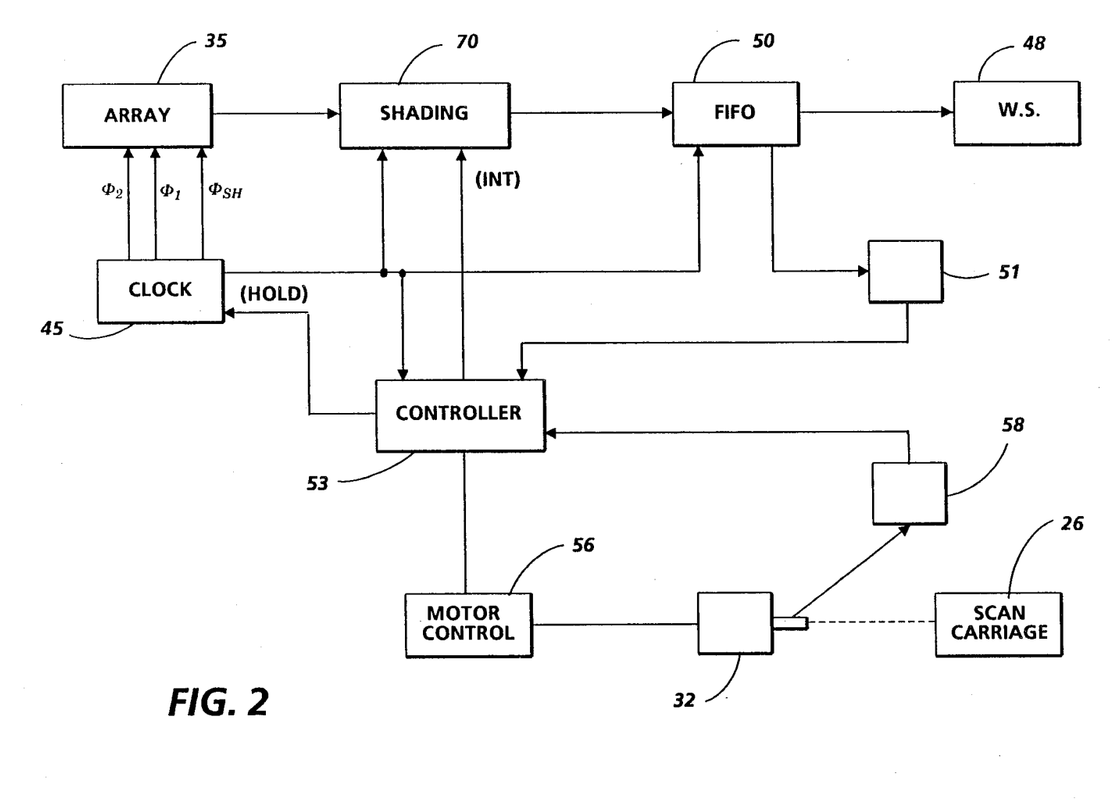
FIG. 2 is a schematic block view showing the principal scanner operating elements as related to the residual charge minimization system of the present invention.

Scanner 10 operates at a variable scanning rate in response to the demand for image signals by the user or workstation 48 which may for example comprise a publishing workstation, personal computer, printer, etc. Referring to FIG. 2, image signals from array 35, after suitable processing including conversion to digital format, are output to the user through a relatively small First in-First out (FIFO) buffer 50. A buffer capacity sensor 51 continuously monitors the residual capacity of buffer 50, the signal from buffer capacity sensor 51 being input to the scanner controller 53. Controller 53 controls carriage motor 32 through a suitable motor controller 56 to regulate the direction in which scan carriage 26 moves and carriage scanning speed, the latter in order to control the residual storage capacity of buffer 50. As a result, the fuller buffer 50 is, the slower the scanning speed, and vice versa. A suitable carriage position sensor 58 tracks movement of carriage 26, controller 53, on movement of carriage 26 with array 35 through a distance equal to one scan line, outputting an integration signal (INT). As will appear, at each integration signal (INT), there is output a good scan line of image signals to buffer 50. A variable rate scanning system of the type referred to above is shown and disclosed in copending application Ser. No. 945,156, filed on Dec. 22, 1986 in the name of Gregory E. Bell, incorporated by reference herein.

Figure 3:
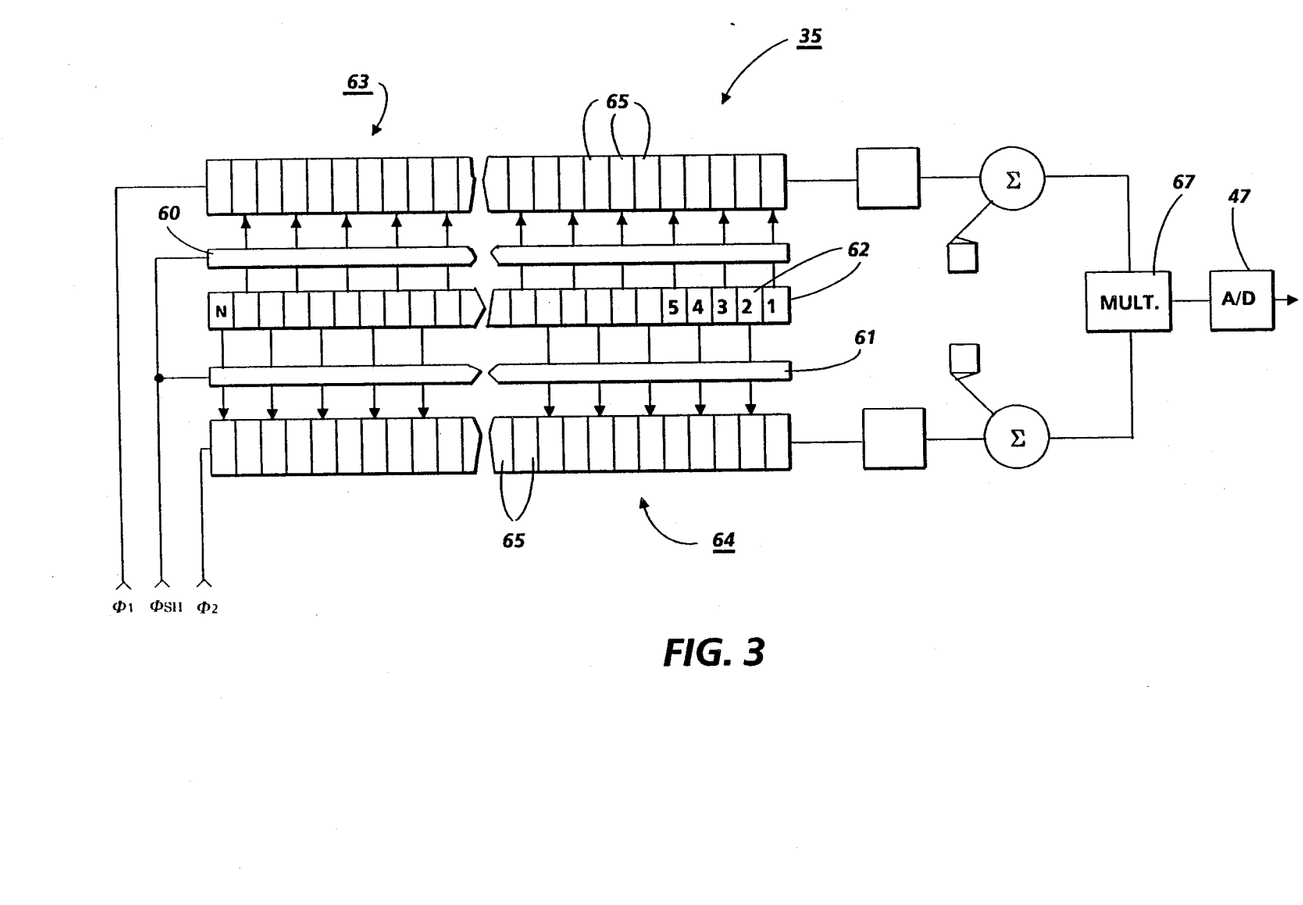
FIG. 3 is a schematic view showing details of the scanning array.
Figure 4:
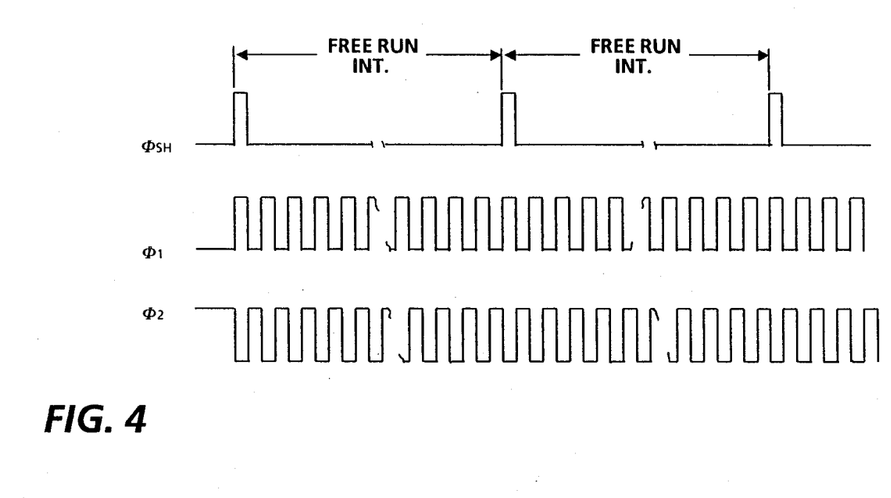
FIG. 4 is a timing chart depicting the timing relationship between the free run integration signals and the shift register clocking pulses.

Referring to FIGS. 3 and 4, shift pulses $\Phi_{SH}$ are input periodically at a fixed clock rate to the array 35. The time between successive shift pulses $\Phi_{SH}$ determines the length of time (the integration period) during which charges are allowed to accumulate on the photosites 62 of array 35, the charge potentials on the individual photosites being a function of the grey level of the area of the image line viewed by each photosite. At the shift pulse $\Phi_{SH}$ ending the integration period, shift gates 60, 61 transfer the image signal charges accumulated by the photosites 62 to an analog shift register pair 63, 64 respectively, charges from the odd numbered photosites (i.e., 1, 3, 5, ... n−1) being transferred to successive stages 65 of shift register 63 while the charges from the even numbered photosites (i.e., 2, 4, 6, ... n) are transferred to successive stages 65 of shift register 64.

Figure 5:
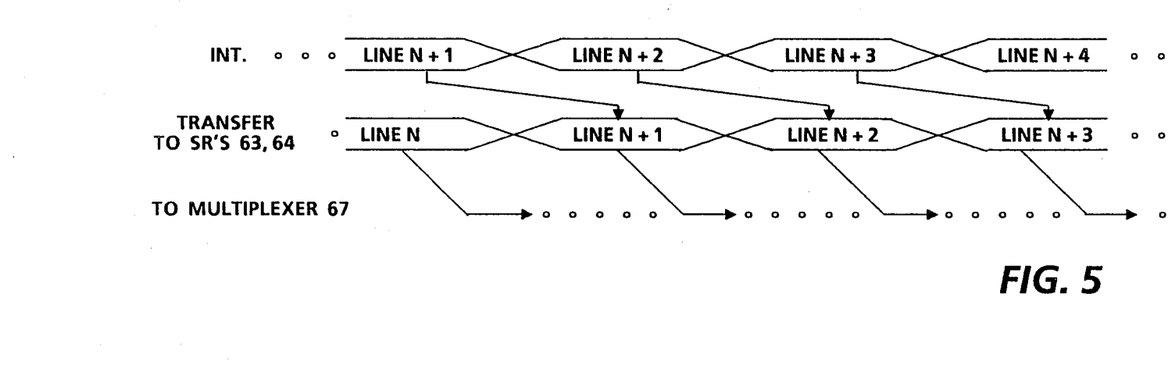
FIG. 5 is a view showing the general timing interrelationship between image line integration and image line discharge.

As depicted in FIG. 5, while each image line (i.e., line N+2) is being scanned and integrated, charges transferred to shift registers 63, 64 from the previous line (i.e. line N+1) are clocked out in alternating fashion by clock pulses $\Phi_1$, $\Phi_2$ to a multiplexer 67 (MULT) which provides a stream of image signal charges to A/D converter 47. Clearing of shift registers 63, 64 is timed to occur during the integration period so that as one line is being integrated, shift registers 63, 64 are being emptied of the image signal charges from the previous line.

As will be understood, to obtain accurate and valid image signals representative of the true image area viewed by each of the photosites 62 of array 35, all charges from the preceding scan line must be cleared from the shift registers 63, 64. Where the scanner operates in a synchronous manner, timing of the integration signal (INT) pulses would normally be fixed, and accordingly, clearing of charges from the shift register stages 65 can be assured by properly synchronizing the clock pulses $\Phi_{SH}$, $\Phi_1$, $\Phi_2$ with the integration signals (INT).

Photosites 62 of array 35 can become saturated if not cleared of image signal charges within a predetermined time interval or window. A typical saturation interval for an array such as array 35 is 6 ms. In order to prevent saturation of the photosites 62, shift pulses $\Phi_{SH}$ (which define the FREE RUN INT periods) are normally generated at a rate greater than that of the saturation interval. A typical rate for the shift pulses $\Phi_{SH}$ is 2 ms.

The digital image signals output from A/D converter 47 are further processed as by shading circuit 70 (shown in FIG. 2). Shading circuit 70 responds to the integration signal (INT) to transfer the line of image signals received from array 35 through any subsequent processing circuits (not shown) to buffer 50 and work station 48. In the absence of an integration signal (INT), the image signals received from array 35, which is continuously scanning, are discarded or dumped. For example, where the residual capacity of buffer 50 is reduced below a preset minimum, the scan carriage ceases to move and hence integration signals (INT) are not generated. Accordingly, the image signals received from the array are discarded.

Figure 6:
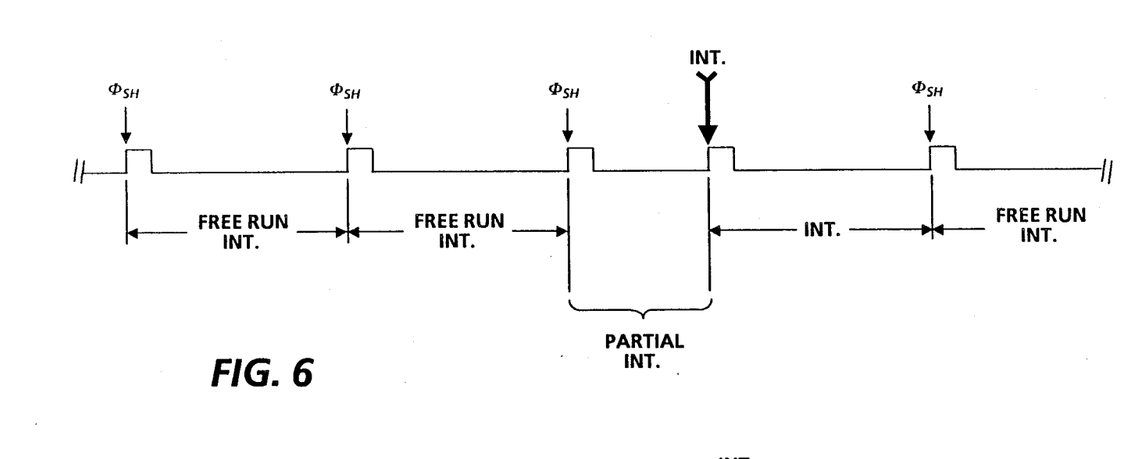
FIG. 6 is a schematic view illustrating the effect of misalignment between the free run integration signals and a valid integration signal in an asynchronously operated scanner with resultant leftover image charges in the array shift registers.

Referring now to FIG. 6, since scanner 10 operates asynchronously, the speed at which carriage 26 moves (and hence the rate at which integration signals are generated) can change in response to user demand as reflected by the residual capacity of buffer 50. Thus, irregular intervals between integration periods are the norm during acceleration, deacceleration, and evey steady state scanning speed of scan carriage 26. As a result, the integration period will almost never be an integral multiple of the time between good scan lines in an asynchronous scanner.

In cases where the integration signal (INT) does not coincide with the integration periods (FREE RUN INT) triggered by clock pulses $\Phi_{SH}$, the integration signal (INT) occurs at some point before the current integration period between successive clock pulses $\Phi_{SH}$ has expired. In that event, a partial integration (PART INT) takes place which is too short to complete the clearing of all stages of the shift registers 63, 64 of image signal charges from the previous line. Where this occurs, there results inaccurate and distorted image signals caused by fresh image signal charges being introduced into shift register stages where image signal charges from the previous line are still present.

Figure 7:
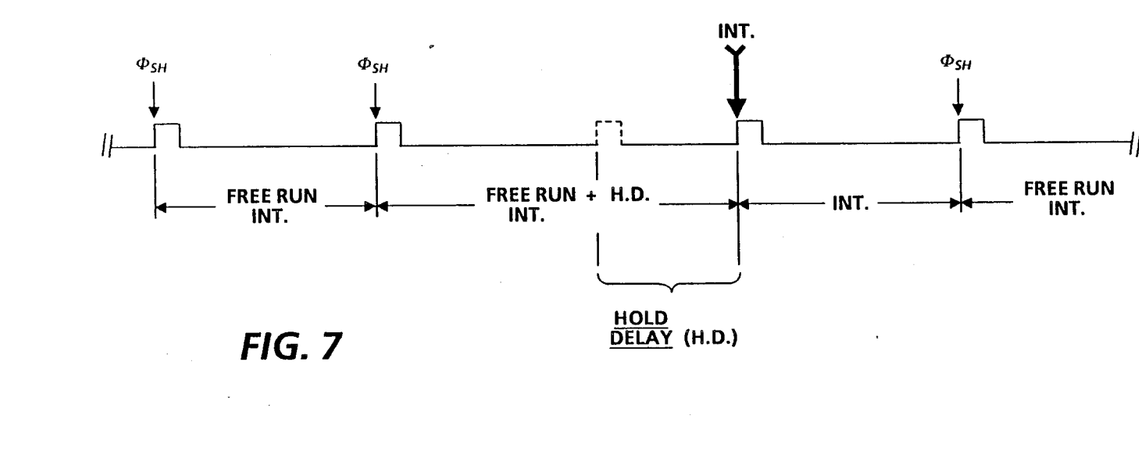
FIG. 7 is a view illustrating the effect of the residual charge minimization system of the present invention in preventing leftover image charges in the array shift registers of an asynchronously operated scanner.
Figure 8:
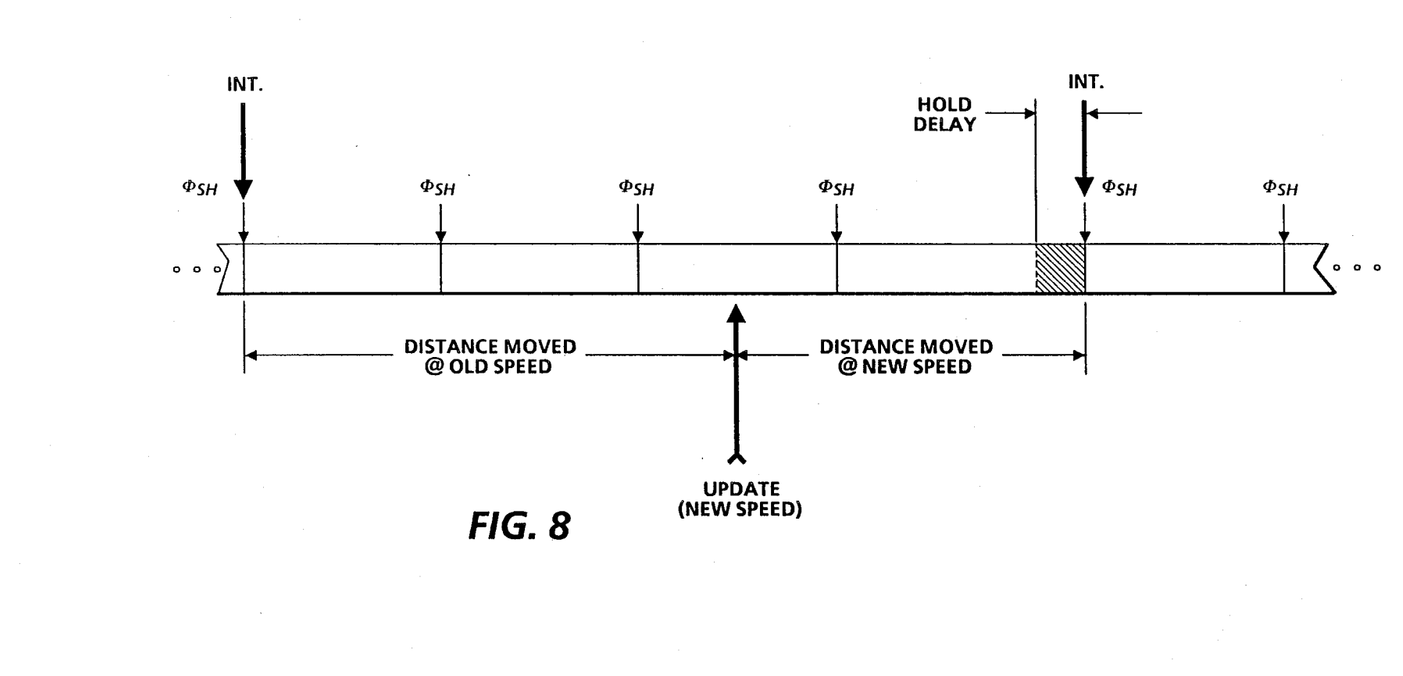
FIG. 8 is a view depicting the effect of a change in scan carriage speed between free run integration signals.
Figure 9:
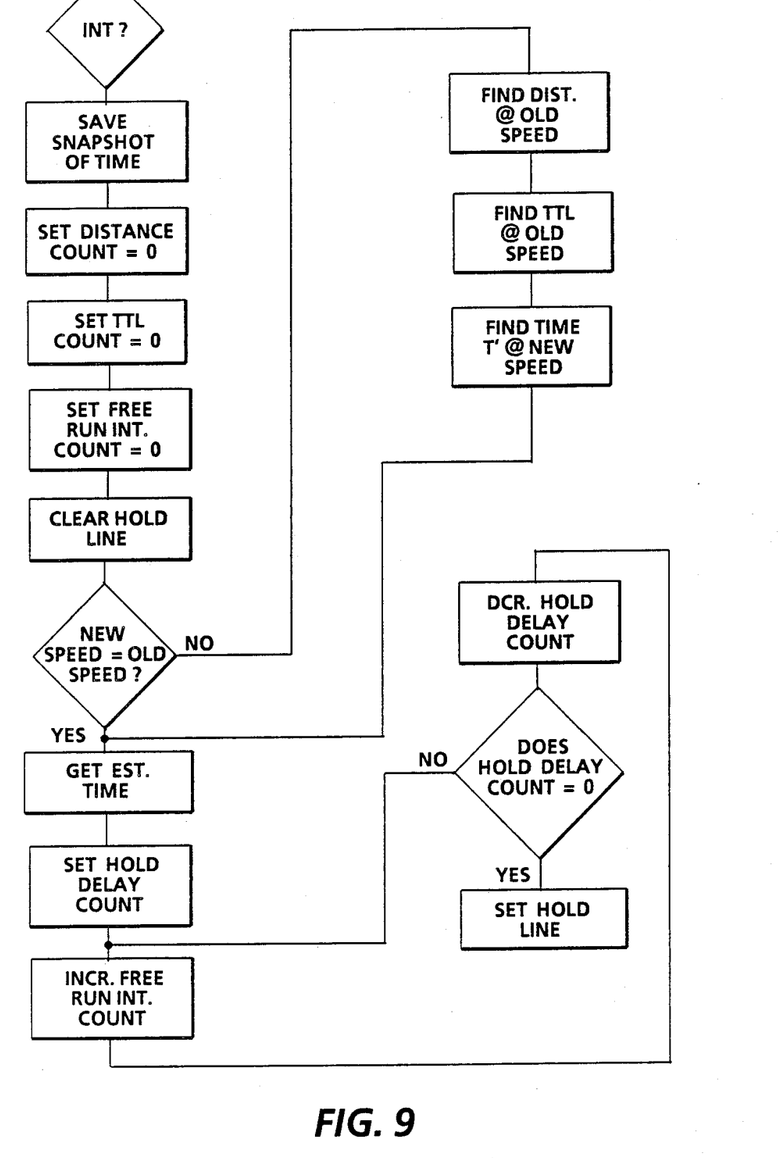
FIG. 9 is a flow chart depicting the process by which the arrival time of the next valid integration signal is calculated.

Referring to FIGS. 7-9, in order to assure that shift registers 63, 64 are cleared of all image signal charges from the previous scan before transfer of the image signal charges from the next line, the arrival time of each integration signal (INT) is predicted. Based on the projected arrival time of the next integration signal (INT), the clock pulse $\Phi_{SH}$ is held (HOLD DELAY) for an interval sufficient to delay transfer of the image signal charges to shift registers 63, 64 to coincide with the integration signal (INT). Thus, where the next integration signal (INT) is predicted to occur in less than that the free run integration period (i.e., 2 ms.) from the current $\Phi_{SH}$ pulse, the hold delay assures that the prior charges are transferred out of the shift registers 63, 64 before the next integration signal (INT) is received and the new integration interval started.

At the interrupt triggered by each integration signal (INT), the predicted arrival time of the next integrate signal (INT) is calculated in accordance with the following relationship:

$$(A) \text{EST. TIME} = \frac{\text{SCANLINE LENGTH}}{\text{CURRENT VELOCITY}}$$

where
EST. TIME is the predicted time for carriage 26 to move to the next line;
SCAN LINE LENGTH is the distance between successive scan lines which is normally fixed (for example, 1,200/in.); and
VELOCITY is the velocity or speed at which carriage 26 moves.
Using the Eally fixed (for example, 1,200/in.); and
VELOCITY is the velocity or speed at which carriage 26 moves.
Using the EST. TIME, a delay count (HOLD DELAY), which is an integer number equal to the number of integrations by clock pulses 101 $_{SH}$ that will occur within the period EST. TIME, is obtained from the following relationship:

HOLD DELAY = EST. TIME/SCAN TIME    (B)

where
SCAN TIME is the time required for array 35 to scan a line and is determined from the following relationship:

SCAN TIME = $(N \times 2)/f$    (C)

where
N is the number of photosites 38 in the array; and
f is the array operating frequency.
Additionally, a snapshot at the time of the current of integration signal (INT) is saved. Distance and total time (TTL) counts, which are used for tracking the distance moved and the total time from the start of the integration signal (INT) respectively, are set to zero and a FREE RUN INT count, which counts the number of integrations resulting from clock pulses $\Phi_{SH}$, is set to zero. The previous hold line (HOLD) is cleared.

As scanning proceeds, the FREE RUN INT count is incremented by 1 on each occurrence of a clock pulse $\Phi_{SH}$ while the HOLD DELAY count is decremented by 1. Where the HOLD DELAY count equals 0, the hold line (HOLD) is set to delay (i.e. hold) the shift pulse 101 $_{SH}$ until the integration signal (INT) is received.

In the asynchronously operated scanner 10, the speed of scan carriage 26 is updated (UPDATE) periodically (i.e., every 8.333 msecs.) to reflectperated scanner 10, the speed of scan carriage 26 is updated (UPDATE) periodically (i.e., every 8.333 msecs.) to reflect any change in the velocity of scan carriage 26. Thus, where the residual capacity of buffer 50 increases, the speed of scanning carriage 26 is increased in an attempt to return the residual buffer capacity back to the desired level, and vice versa. Accordingly, when predicting the next integration signal (INT), it is necessary to see if there has been a change in the velocity of carriage 26 as a result of the update signal (UPDATE). If no change in velocity has occurred, the current velocity (OLD SPEED) of carriage 26 is used in the calculations. Where a change in velocity of carriage 26, which can be either an increase or decrease in carriage speed, has occurred, the velocity change (NEW SPEED) is factored into the calculations.

For this, the updated speed (NEW SPEED) is compared with the previous speed (OLD SPEED). If the updated speed (NEW SPEED) is equal to the previous speed (OLD SPEED), the time at speed is equal to the length of the clock interval between update speed pulses (i.e., 8.333 msec.)

Next a check is made of the current state of the INT HOLD delay count. If the count is 1, then return is made. If not, the update speed time is saved for use for predicting the next integration signal (INT).

Referring particularly to FIG. 8, if the updated speed (NEW SPEED) is not equal to the previous speed (OLD SPEED), the distance moved by carriage 26 at the old speed (DIST MOVED) is determined using the following relationship:

DIST@Speed = (OLD SPEED)(TIME@SPEED)    (D)

Total Time (TTL) at the previous speed (OLD SPEED) is next determined from the following relationship:

TOTAL TIME(TTL) + = Dist@Speed/OLD SPEED    (E)

The time at the updated speed (NEW SPEED) is found by subtracting the fixed distance between scan lines (i.e., 1200) from the distance moved at the old speed (DIST. MOVED) and dividing by the new speed as per the following:

$$(F)\text{Time@New Speed}(T') = \frac{1200 - \text{Distance@OLDSPEED}}{\text{NEW SPEED}}$$

The sum of TTL and T' gives the EST TIME. Using equation B, the HOLD DELAY is calculated, i.e.:

$$\text{HOLD DELAY} = \frac{\text{EST. TIME}}{\text{SCAN TIME}} = \frac{TTL + T'}{\text{SCAN TIME}}$$

While an exemplary scanner is shown and described, other suitable scanner designs and types for effecting relative scanning movement between the image bearing document and the scanning array may be contemplated such as for example a scanner of the type where the image document is moved past a scan slit by a document transport for scanning by a stationary array. Further, the invention is not limited to the particular array type described but instead contemplates any array type in which it is desirable to minimize residual charges in the array shift register or shift registers due to asynchronous operation.

While the invention has been described with reference to the structure disclosed, it is not confined to the details set forth, but is intended to cover such modifications or changes as may come within the scope of the following claims.

I claim:

1. A process for minimizing residual charges in a scanning array of the type having at least one row of sensors for scanning an image viewed by the array during an integration period, and at least one shift register for receiving the image charges developed by the sensors following the integration period, in which it is required that the shift register be cleared of residual charges during each integration period to assure an accurate and undistorted image signal output, comprising the steps of:
   (a) periodically generating first integration signals defining an integration period of predetermined duration sufficient to preclude saturation of said array sensors yet sufficient to allow time for said shift register to be cleared of residual charges from the preceding integration cycle;
   (b) randomly generating integration signals in response to a demand for image signals;
   (c) at each integration signal, predicting the arrival time of the next integration signal; and
   (d) where the predicted arrival time of said next integration signal is less than the integration period defined by said periodic first integration signals, delaying the last one of said first integration signals before said next integration signal to extend the predetermined integration period provided by said first integration signals and assure clearing of residual charges from said shift register.

2. The process according to claim 1 including the steps of:
   moving one of said array and image relative to the other during scanning; and
   predicting the arrival time of said next integration signal from the rate at which said array or image is moved.

3. The process according to claim 2 including the steps of:
   periodically updating the rate at which said array or image is moved to accommodate changes in image signal demand; and
   where the rate at which said array or image is moved changes, proportionally factoring said new rate with the previous rate when predicting the arrival time of said valid integration signal.

4. In a raster input scanner, the combination of:
   (a) an array having at least one row of photosensors for scanning an image line by line and at least one shift register to which image charges from said photosensors are transferred, said photosensors constantly integrating the instantaneous image viewed by said photosensors, the combination of:
   (b) clock means for driving said array, said clock means providing periodically timed dumping pulses defining an integration period during which said sensors integrate the image viewed and provide charges representative thereof to said shift register, said clock means providing periodic shift register drive pulses for clocking charges from the previous integration period from said shift register to clear said shift register to receive charges from the next integration period;
   (c) means for generating an integration pulse in response to a demand for image signals;
   (d) means for predicting the arrival time of said integration pulse; and
   (e) means for delaying the last dumping pulse before said integration pulse when the interval between said last dumping pulse and said integration pulse is less than said integration period by an amount substantially equal to the difference between said last dumping pulse and said integration pulse whereby to synchronize said dumping pulses with the predicted arrival of said integration pulse.

5. The scanner according to claim 4 including
   (a) a movable carriage for supporting said array for scanning movement;
   (b) means for driving said carriage;
   (c) control means for controlling said driving means and varying said carriage speed in response to image signal demand;
   said predicting means including means effective on a change in carriage speed to combine any new carriage speed with the previous carriage speed when predicting the arrival time of said integration pulse.

6. In a raster input scanner, the combination of:
   (a) at least one array, said array having at least one row of photosensors and at least one shift register for receiving image charges transferred from said photosensors;
   (b) means supporting an image for viewing by said photosensors;
   (c) a movable carriage supporting said array;
   (d) clock means for operating said array to provide repeated dumping cycles during which charges representing the image viewed are accumulated through a preset integration interval by said photosensors for transfer to said shift register, residual charges from the previous integration interval being cleared from said shift register during said integration interval;

(e) means for varying the speed of said carriage in response to image signal demand;

(f) means responsive to movement of said carriage through one scan line to generate a start integration signal;

(g) means to predict said start integration signal; and (h) means responsive to said prediction for extending the last dumping cycle before said start integration signal when the next dumping cycle is found to be too short to permit said shift register to be cleared.

7. A process for minimizing residual charges in a scanning array in which the array has at least one row of sensors for scanning an image viewed by the array during arges in a scanning array in which the array has at least one row of sensors for scanning an image viewed by the array during an integration period, and at least one shift register for receiving the image charges developed by said sensors following said integration period, in which it is required that said shift register be cleared of residual charges during each integration period to assure an accurate and undistorted image signal output, comprising the steps of:

(a) periodically generating dumping signals, each of said dumping signals triggering a predetermined integration period sufficient to preclude saturation of said array sensors yet sufficient to allow time for said shift register to be cleared of residual charges from the preceding integration period;

(b) randomly generating start integration signals in response to a demand for image signals;

(c) at each start integration signal, predicting the arrival time of the next start integration signal; and (d) where the predicted arrival time of the next start integration signal is different from the integration periods triggered by said dumping signals, holding the last full one of said integration periods before said next start integration signal until said next start integration signal whereby to extend said last full integration period and assure clearing of charges from said shift register.

* * * * *